United States Patent [19]
Kim et al.

[11] Patent Number: 5,682,341
[45] Date of Patent: Oct. 28, 1997

[54] ADAPTIVE SIGNAL PROCESSOR USING NEWTON/LMS ALGORITHM

[75] Inventors: Seong-Dae Kim, Taejon; Tae-Sung Kim, Seoul, both of Rep. of Korea

[73] Assignee: Korea Advanced Institute of Science and Technology, Daejeon, Rep. of Korea

[21] Appl. No.: 435,912

[22] Filed: Apr. 19, 1995

[51] Int. Cl.$^6$ .................................................. G06F 17/10
[52] U.S. Cl. .................... 364/724.19; 364/725; 364/726; 364/728.03
[58] Field of Search .................. 364/724.19, 724.05, 364/724.18, 725, 728.01, 728.07, 726; 375/232

[56] References Cited

U.S. PATENT DOCUMENTS

| | | | |
|---|---|---|---|
| 4,589,133 | 5/1986 | Swinbanks | 381/71 |
| 4,791,390 | 12/1988 | Harris et al. | 333/166 |
| 4,843,583 | 6/1989 | White et al. | 364/724.19 |
| 4,868,850 | 9/1989 | Kaku et al. | 375/231 |
| 5,058,047 | 10/1991 | Chung | 364/724.19 |
| 5,168,459 | 12/1992 | Hiller | 364/724.19 |
| 5,253,192 | 10/1993 | Tufts | 364/726 |
| 5,418,849 | 5/1995 | Cannalire et al. | 379/410 |
| 5,418,857 | 5/1995 | Eatwell | 381/71 |
| 5,513,531 | 5/1996 | Sapia et al. | 73/602 |
| 5,535,150 | 7/1996 | Chaing | 364/724.19 |
| 5,553,014 | 9/1996 | De Leon et al. | 364/724.19 |

*Primary Examiner*—Reba I. Elmore
*Assistant Examiner*—Robert J. Dolan
*Attorney, Agent, or Firm*—Merchant, Gould, Smith, Edell, Welter & Schmidt, P.A.

[57] ABSTRACT

An adaptive signal processor using a Newton/least mean square (LMS) algorithm, adapted to remove a signal distortion or noise. The adaptive signal processor is adapted to derive an autocorrelation matrix from an input signal, derive an inverse matrix of the autocorrelation matrix by executing DCT twice or executing DFT and IDFT, and apply the derived inverse matrix to an adaptive signal processing, thereby capable of greatly reducing the total amount of computations to derive the inverse matrix, achieving an easy hardware realization thereof and reducing the manufacture cost thereof.

2 Claims, 4 Drawing Sheets

ADAPTIVE SIGNAL PROCESSOR USING NEWTON/LMS ALGORITHM

BACKGROUND OF THE INVENTION

1. Field of the Invention

The present invention relates to an adaptive signal processor, and more particularly to an adaptive signal processor using a Newton/least mean square (LMS) algorithm, adapted to remove signal distortions or noise generated when an electrical signal passes through a non-ideal medium.

2. Description of the Prior Art

Conventional adaptive signal processors have mainly used the LMS algorithm proposed by Widrow and Hoff. The reason why the LMS algorithm has mainly been used is because this algorithm can be simply realized in terms of hardware. However, it has slow convergence.

Since a more rapid convergence can be obtained using an input signal autocorrelation matrix R derived on the basis of prior knowledge, Widrow proposed a Newton/LMS algorithm modified from the existing LMS algorithm and expressed by the following equation (1):

$$W_{n+1} = W_n + \mu R^{-1} e_n X_n \quad (1)$$

$$e_n = d_n - X_n^T W_n \quad (2)$$

$$R = E[X_n X_n^T] \quad (3)$$

where, $X_n$ is an input vector of an adaptive signal processor, $d_n$ is its desired response, $y_n$ is the output of the adaptive signal processor, $e_n$ is an error signal, and $W_n$ is the weight vector of the adaptive signal processor, which is to be derived. The constant $\mu$ is the adaption constant for designating a speed for converging on an option value when being adapted. The superscript T following a matrix indicates the transpose of the matrix. In equation 3, the definition of the autocorrelation matrix, R, is the expectation, or the average value of the random variable $X_n X_n^T$.

Although this Newton/LMS algorithm has an advantage that an optimum solution can be rapidly derived, it has a disadvantage that the statistical characteristics of input data should be previously known in spite of the fact that this characteristic is difficult to be known.

Meanwhile, Widrow and Diniz proposed a Newton/LMS algorithm based on a recursive inversion method for deriving the inverse matrix $R^{-1}$ of the autocorrelation matrix R of input data. This algorithm derives the inverse matrix $R^{-1}$ by using the following equations (4) and (5). Equation (4) is used to derive an estimate value of the autocorrelation matrix R, and the matrix inversion is carried out by the equation (5).

$$R_n = (1-\alpha) R_{n-1} + \alpha X_n X_n^T, \quad 0 < \alpha < 1 \quad (4)$$

$$R_n^{-1} = \frac{1}{1-\alpha} \left[ R_{n-1}^{-1} - \frac{[R_{n-1}^{-1}][R_{n-1}^{-1} X_n]^T}{\frac{1-\alpha}{\alpha} + [R_{n-1}^{-1} X_n]^T X_n} \right] \quad (5)$$

However, this algorithm has a disadvantage in that the large number of computations required to derive the inverse matrix $R^{-1}$ is very time consuming. Due to such a disadvantage, it is difficult to realize the algorithm.

SUMMARY OF THE INVENTION

The object of the invention is to provide an adaptive signal processor based on the Newton/LMS algorithm in which the total number of computations required for the matrix inversion is greatly reduced. As a result, its hardware realization becomes easier and its manufacturing cost is reduced.

In accordance with one aspect, the present invention provides an adaptive signal processor which derives an inverse matrix of an autocorrelation matrix obtained from input signal data so as to update the weight vector of the adaptive signal processor, comprising: a temporary autocorrelation function estimator and an autocorrelation function estimator both for estimating the autocorrelation matrix from the input signal data; a discrete Fourier transform unit for executing a discrete Fourier transform of the first row of the estimated autocorrelation matrix, thereby deriving eigenvalues of the autocorrelation matrix values; an inverse function generator for deriving reciprocals of the eigenvalues; and an inverse discrete Fourier transform unit for executing the inverse discrete Fourier transform of the reciprocals of the eigenvalues, thereby deriving the inverse autocorrelation matrix.

In accordance with another aspect, the present invention provides an adaptive signal processor which calculates the inverse matrix of an autocorrelation matrix obtained from input signal data so as to update the weight vector of the adaptive signal processor, comprising: a temporary autocorrelation function estimator and an autocorrelation function estimator both for estimating the autocorrelation matrix from the input signal data; a first discrete cosine transform unit for executing a discrete cosine transform of the first row of the estimated autocorrelation matrix, thereby deriving eigenvalues of the autocorrelation matrix values; an inverse function generator for deriving the reciprocals of the eigenvalues; and a second discrete cosine transform unit for executing a discrete cosine transform of the reciprocals of the eigenvalues, thereby deriving the inverse autocorrelation matrix.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
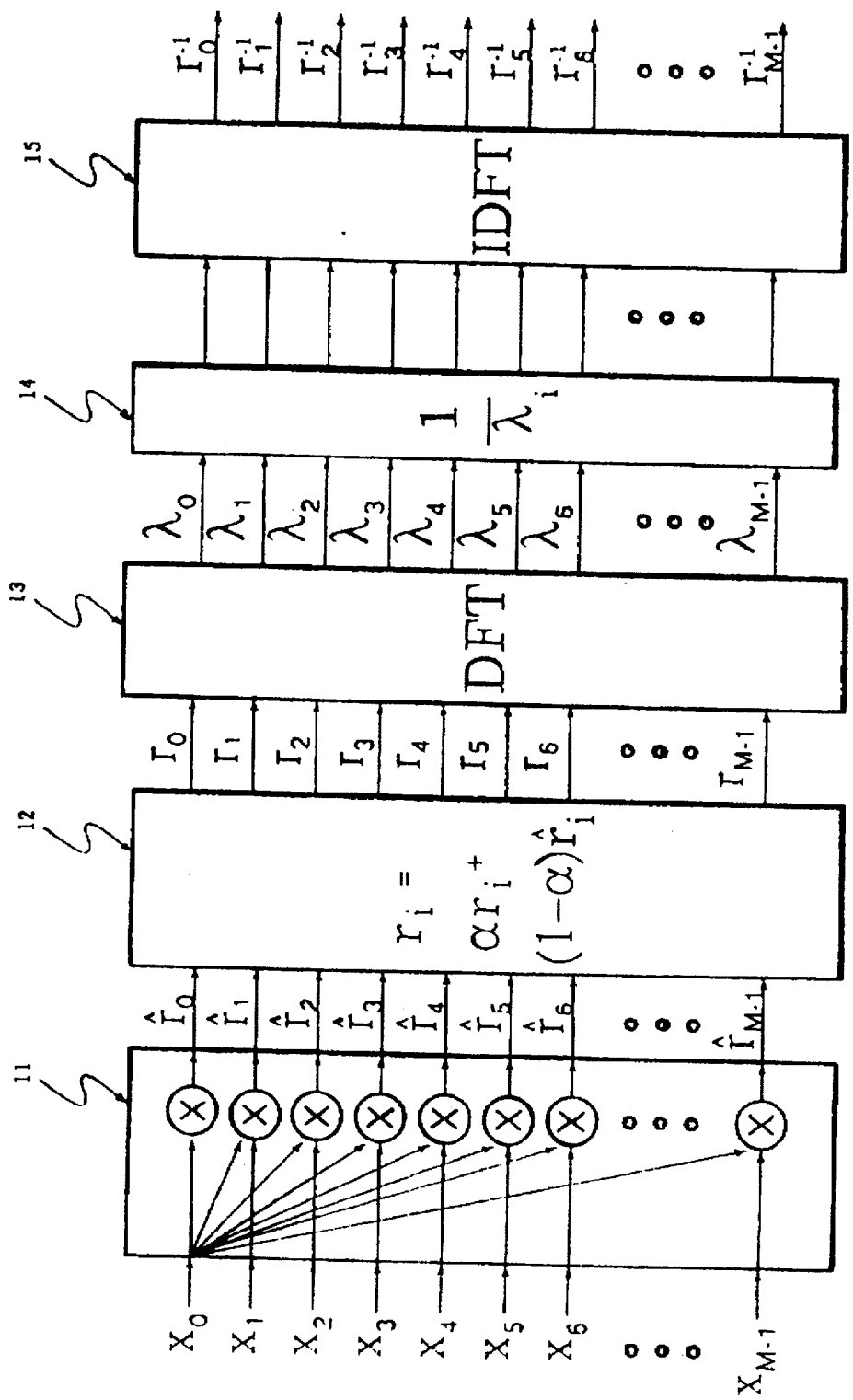
FIG. 1 is a block diagram illustrating a matrix inverter constituting a part of an adaptive signal processor in accordance with the present invention and being adapted to derive the inverse matrix of an input signal autocorrelation matrix using a discrete Fourier transform.

For deriving the eigenvalues $\lambda(k)$ of the autocorrelation matrix R, first, a base vector F(k) is defined by the following equation (6):

$$F(k) = \begin{vmatrix} 1 \\ \exp\left[-j\frac{2\pi}{M}k\right] \\ \exp\left[-j\frac{2\pi}{M}2k\right] \\ \vdots \\ \exp\left[-j\frac{2\pi}{M}(M-1)k\right] \end{vmatrix} \quad (6)$$

where, j means $\sqrt{-1}$ (namely, $j=\sqrt{-1}$) and $0 \leq k < M$, M being the filter number.

If the autocorrelation matrix R is Toeplitz, circulant and symmetric, the base vector F(k) is selected as an eigenvector of the autocorrelation matrix R. A Toeplitz matrix is one in which each diagonal is formed by repeating a single fixed number down that diagonal, where different numbers are used for different diagonals. In the symmetric Toeplitz matrix, the matrix elements are symmetric about the leading diagonal. Thus, the elements of the first column are the same as the elements of the first row. In this case, the relation among R, F(k) and $\lambda(k)$ can be expressed by the following equation (7):

$$RF(k) = \lambda(k) \cdot F(k) \quad (7)$$

Where a new matrix F defined by the following equation (8) is given, base vectors F(k) are orthogonal to one another. In this case, an element $F_{k,i}$ of the matrix F and an element $F^{-1}_{k,i}$ inverse matrix $F^{-1}$ of the matrix F are expressed by the following equations (9) and (10), respectively:

$$F = [F(0)F(1)F(2) \ldots F(M-1)] \quad (8)$$

$$F_{k,i} = \exp\left[-j\frac{2\pi}{M}ki\right] \quad (9)$$

$$F^{-1}_{k,i} = \frac{1}{M}\exp\left[j\frac{2\pi}{M}ki\right] \quad (10)$$

$$FF^{-1} = F^{-1}F = I \quad (11)$$

where, I is the M×M identity matrix.

To be noticed in the above equations is that rows of the matrix F are linearly independent from one another because of the existence of the inverse matrix $F^{-1}$.

On the other hand, a discrete Fourier transform (DFT) is defined by the following equation (12):

$$X(k) = \sum_{n=0}^{M-1} x(n)\exp\left[-j\frac{2\pi}{M}kn\right] \quad (12)$$

By comparing this equation with the equation (7) defining the eigenvalue $\lambda(k)$, it can be found that these equations are the same. It can be also found that when an optional circulant matrix R is given, the DFT of the first row of the matrix R gives eigenvalues of the matrix R. The DFT of a matrix having circulant and symmetric properties always becomes a real number by virtue of the property thereof. Therefore, the procedure for obtaining the eigenvalues of the matrix R can be simplified by the following equation (14) when M is an even number and by the following equation (15) when M is an odd number, respectively:

$$\lambda(k) = r(0) + r(M-1)\left\{\exp\left[-j\frac{2\pi}{M}k\right] + \exp\left[-j\frac{2\pi}{M}(M-1)\right]\right\} + \quad (13)$$

$$r(M-2)\left\{\exp\left[-j\frac{2\pi}{M}2k\right] + \exp\left[-j\frac{2\pi}{M}(M-2)\right]\right\} + $$

$$\ldots + r\left(\frac{M}{2}\right)\{\exp[-j\pi k]\}$$

$$\lambda(k) = r(0) + r\left(\frac{M}{2}\right)\cos\pi k + 2\sum_{i=1}^{M/2-1} r(i)\cos\left(\frac{2\pi}{M}ik\right) \quad (14)$$

(M is an even number)

$$\lambda(k) = r(0) + 2\sum_{i=1}^{M/2-1} r(i)\cos\left(\frac{2\pi}{M}ik\right) \quad (15)$$

(M is an odd number)

If the autocorrelation matrix R of input data is known, its eigenvalues can be derived only from M/2+1 (M is an even number) or (M+1)/2 (M is an odd number) data of the first row of the matrix R. In this case, the equations (14) and (15) are used.

If a matrix including the eigenvalues derived in the above-mentioned manner as its diagonal elements is defined as D, the following equations (16) and (17) are established on the basis of the above equations (11) and (7). By taking an inversion of the equation (16), the following equation (18) can be obtained:

$$R = FDF^{-1} \quad (16)$$

$$D = F^{-1}RF \quad (17)$$

$$R^{-1} = FD^{-1}F^{-1} \quad (18)$$

By substituting the equations (9) and (10) into the equation (18) under a condition that D is known, each element of the first row of the inverse matrix $R^{-1}$ can be derived as follows:

$$\begin{aligned} r^{-1}(k) &= \sum_{i=0}^{M-1} \lambda^{-1}(i)\exp\left[j\frac{2\pi}{M}ik\right] \\ &= \sum_{i=0}^{M-1} \lambda^{-1}(i)\cos\left[\frac{2\pi}{M}ik\right] \end{aligned} \quad (19)$$

$$r^{-1}(k) = \lambda^{-1}(0) + \lambda^{-1}\left(\frac{M}{2}\right)\cos\pi k + 2\sum_{i=0}^{M/2-1} \lambda^{-1}(i)\cos\left(\frac{2\pi}{M}ik\right) \quad (20)$$

(M is an even number)

$$r^{-1}(k) = \lambda^{-1}(0) + 2\sum_{i=0}^{M/2-1} \lambda^{-1}(i)\cos\left(\frac{2\pi}{M}ik\right) \quad (21)$$

(M is an odd number)

Accordingly, the first row of the circulant matrix can be derived by calculating the matrix constituted by reciprocals of the eigenvalues on the basis of the equation (19). As the derived first row is re-arranged in the form of a Toeplitz matrix, the inverse matrix $R^{-1}$ is derived. In this case, the equation (19) is similar a discrete cosine transform (DCT). For convenience of description, therefore, the equation is referred to as DCT.

However, the matrix R can be derived only when several input data exist. Furthermore, the procedure of deriving the matrix R requires a long processing time. It, therefore, is desirable that the matrix R is derived in an iterative manner in the procedure of converging the weight vector from input data.

Referring to FIG. 1, there is shown a matrix inverter constituting an adaptive signal processor in accordance with the present invention. The matrix inverter is adapted to derive an inverse matrix of an input signal autocorrelation matrix. As shown in FIG. 1, the matrix inverter includes a temporary autocorrelation function estimator 11 adapted to derive values of the first column of the autocorrelation matrix from M input data $X_0$ to $X_{M-1}$, an autocorrelation function estimator 12 adapted to derive average values $r_0$ to $r_{M-1}$ of the autocorrelation values from the outputs of the temporary autocorrelation function estimator 11 in a circulative manner, a DFT unit 13 adapted to execute a DFT of the average autocorrelation values $r_0$ to $r_{M-1}$ outputted from the autocorrelation function estimator 12 and thereby derive eigenvalues $\lambda_0$ to $\lambda_{M-1}$, an inverse function generator 14 adapted to derive inverse values of the eigenvalues $\lambda_0$ to $\lambda_{M-1}$ outputted from the DFT unit 13, and an inverse DFT (IDFT) unit 15 adapted to execute an IDFT of the inverse values, of the eigenvalues, outputted from the inverse function generator 14 and thereby derive values $r^{-1}_0$ to $r^{-1}_{M-1}$ of the first column of the inverse autocorrelation matrix.

When M input data $X_0$ to $X_{M-1}$ are inputted at the matrix inverter having the above-mentioned construction in accordance with the present invention, the temporary autocorrelation function estimator 11 derives values $r_0$ to $r_{M-1}$ of the first column of the autocorrelation matrix on the basis of the following equations:

$$f_0 = x_0 x_0$$

$$f_1 = x_0 x_1$$

$$f_{M-1} = x_0 x_{M-1}$$

However, the value $r_k$ derived in the above-mentioned manner is not an average value, but a value for one data. Accordingly, the average value should be derived from the value $r_k$. The updated average value $r_i$ is derived in the autocorrelation function estimator 12 using the following equation for a circulant estimation:

$$r_i = \alpha^+ r_i + (1-\alpha) f_i \quad (22)$$

Where several data are inputted, where α is the adaption constant, $r^+_i$ is a previous value of $r_i$, and $f_i$ is the ith output from the temporary autocorrelation function estimator 11. The $r_i$ values become relatively accurate autocorrelation values for $r_0$ to $r_{M-1}$. These autocorrelation values are then DFTed by the DFT unit 13 to derive their eigenvalues $\lambda_0$ to $\lambda_{M-}$. In the inverse function generator 14, inverse values of the eigenvalues are derived. The IDFT unit 15 carries out an IDFT of the inverse values of the eigenvalues and thereby derives values $r^{-1}_0$ to $r^{-1}_{M-1}$ of the first column of the inverse matrix of the desired autocorrelation matrix.

Figure 2:
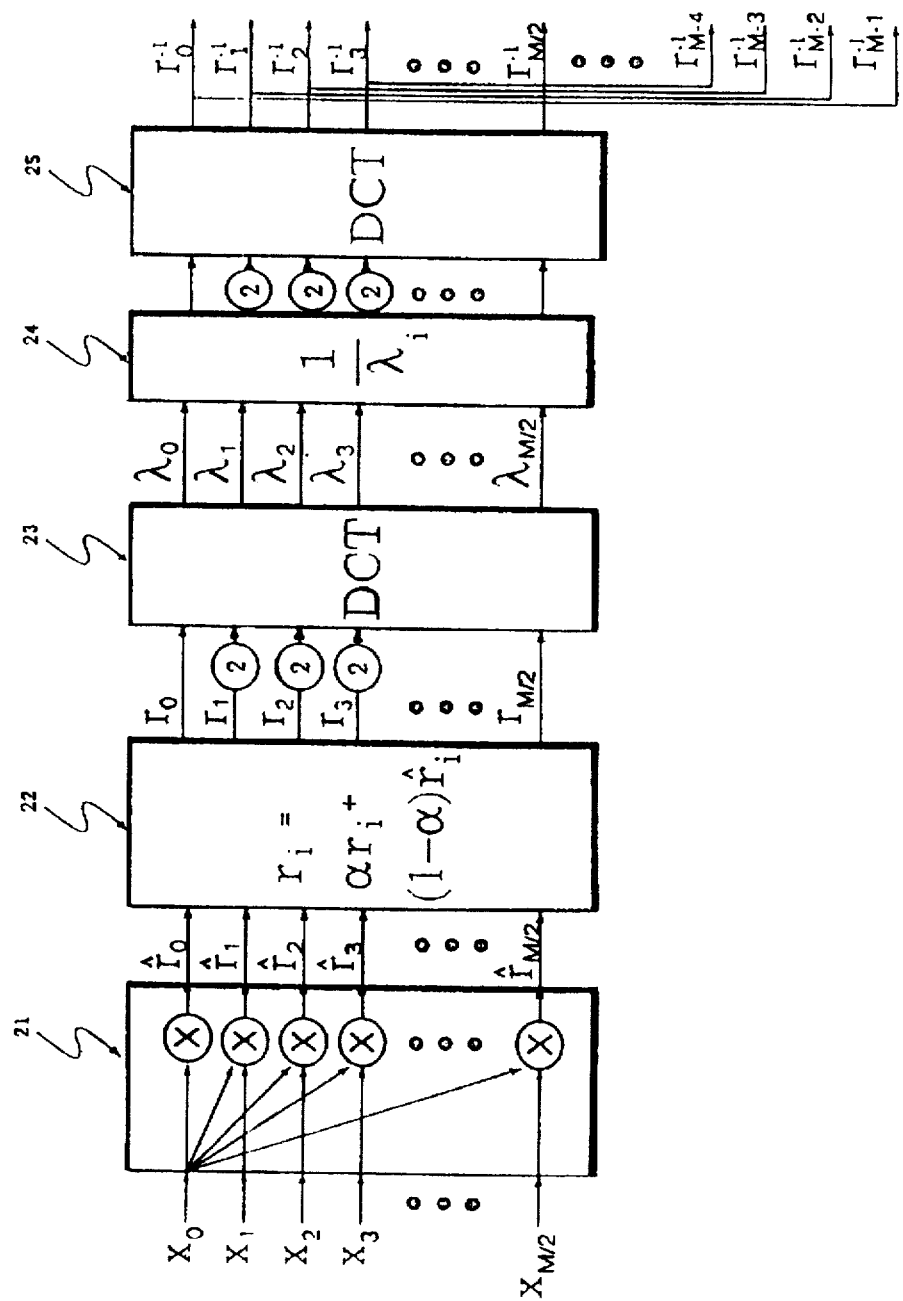
FIG. 2 is a block diagram illustrating a simplified construction of the matrix inverter of FIG. 1 where the dimension of the autocorrelation matrix is even.
Figure 3:
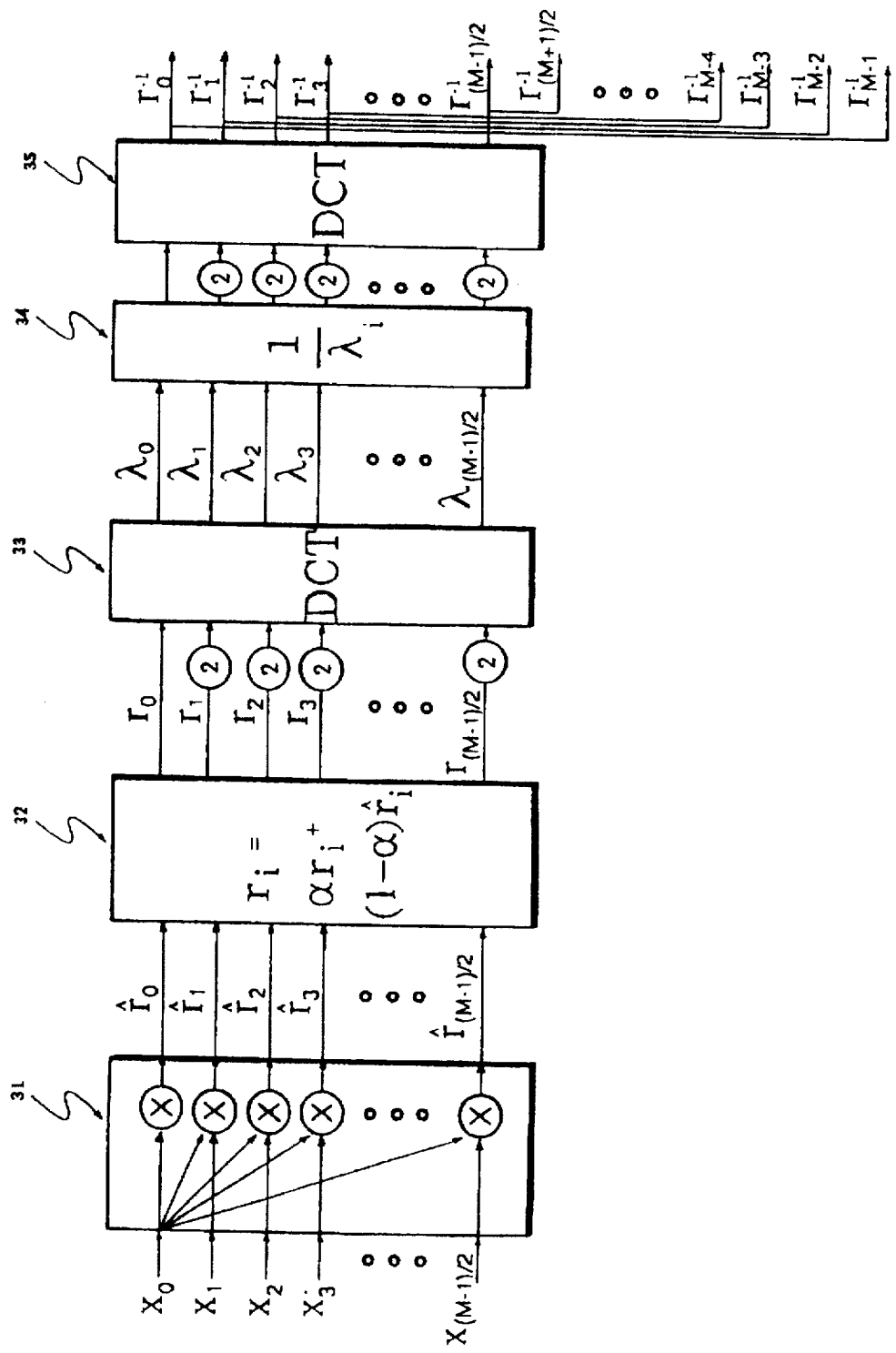
FIG. 3 is a block diagram illustrating a simplified construction of the matrix inverter of FIG. 1 where the dimension of the autocorrelation matrix is odd.

FIGS. 2 and 3 illustrate simplified constructions of the matrix inverter of FIG. 1 where the dimensions of the autocorrelation matrix are even and odd, respectively. The matrix inverters shown in FIGS. 2 and 3 are simplified in construction because they utilize DCT to derive the inverse matrix $R^{-1}$ using the above-mentioned equation (14). The temporary autocorrelation function estimators 21 and 31, autocorrelation function estimators 22 and 32 and inverse function generators 24 and 34 in the cases of FIGS. 2 and 3 have the same functions as those of the estimators 11 and 12 and inverse function generator 14 in the case of FIG. 1, respectively. The DFT unit 13 and IDFT unit 15 in the case of FIG. 1 are substituted by the DCT units 23 and 25 in the case of FIG. 2 and by the DCT units 33 and 35 in the case of FIG. 3. Thus, the overall construction of matrix inverter is simplified.

Figure 4:
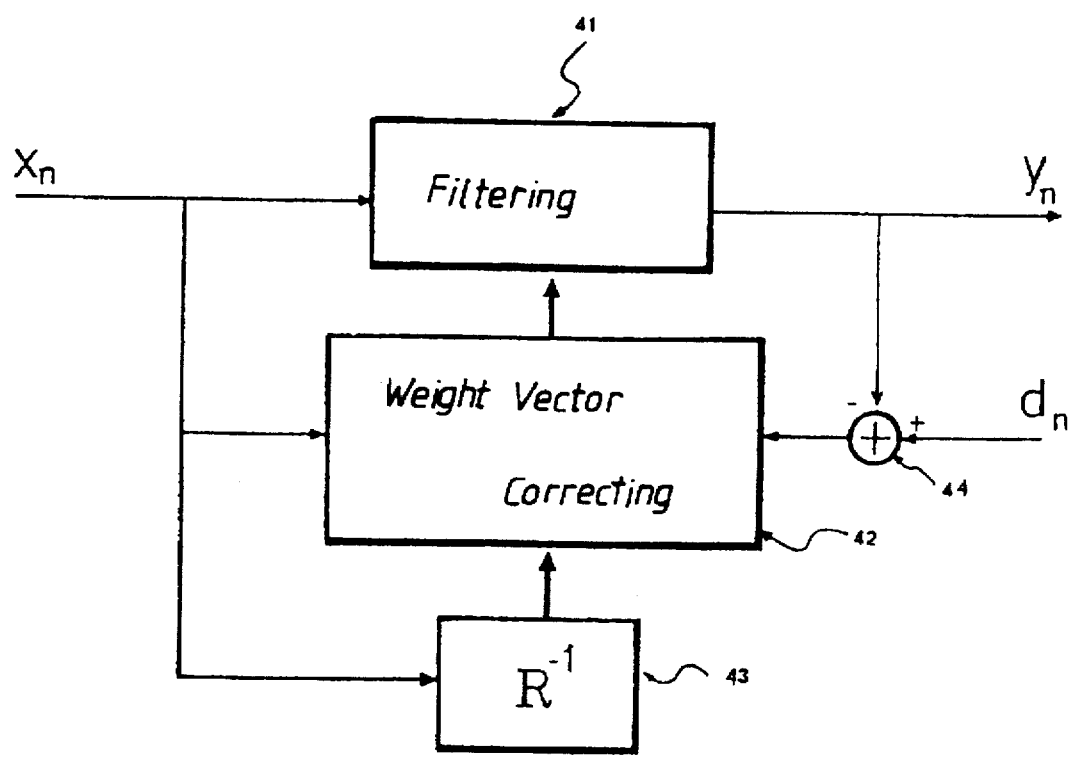
FIG. 4 is a block diagram illustrating the overall construction of the adaptive signal processor in accordance with the present invention.

FIG. 4 is a block diagram illustrating the overall construction of the adaptive signal processor in accordance with the present invention. As mentioned above, the Newton/LMS algorithm using DCT is applied to the adaptive signal processor. As shown in FIG. 4, the adaptive signal processor includes a filter 41 for filtering an input signal $X_n$, a matrix inverter 43 for deriving an inverse autocorrelation matrix from the input signal $X_n$, an adder 44 for adding an output of the filter 41 to a desired response signal $d_n$, and a weight vector corrector 42 for correcting the weight vector of the signal being filtered using outputs of the matrix inverter 43 and adder 44. Operations of the adaptive signal processor utilizing the Newton/LMS algorithm are expressed by the following equations:

$$W_{n+1} = W_n + \mu R_n^{-1} \epsilon_n X_n \quad (23)$$

$$R_n^{-1} = \text{toeplitz}(DCT(DCT(r_n))^{-1}) \quad (24)$$

$$r_n = \alpha r_{n-1} + (1-\alpha) r_n, \quad 0 < \alpha < 1 \quad (25)$$

$$r_n = (x_n x_n, x_n x_{n+1}, x_n x_{n+2} \cdots x_n x_{n+M-1}) \quad (26)$$

where, $R^{-1}$ is an M×M matrix, Toeplitz () is a function for making an M×M matrix which is symmetric and Toeplitz and has M×1 vectors on its first column, and $r_n$ is M×1 vectors $E_n = d_n - y_n$ from FIG. 4.

DCT expressed by the equations (14) and (15) is expressed as DCT for convenience even though it has a slightly different form from that of an existing DCT.

As apparent from the above description, the present invention provides an adaptive signal processor adapted to derive an autocorrelation matrix from an input signal, derive an inverse matrix of the autocorrelation matrix by executing a DCT twice or by executing a DFT followed by an IDFT, and applying the derived inverse matrix to adaptive signal processing, thereby greatly reducing the total number of computations required to derive the inverse matrix, thereby achieving an easy hardware realization thereof and reducing the manufacturing cost thereof.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An adaptive signal processor adapted to derive an inverse matrix of an autocorrelation matrix from input signal data so as to update a weight vector of the signal processor, comprising:

a filter for filtering said input signal data;

a matrix inverter for deriving the inverse autocorrelation matrix from said input signal data, said matrix inverter including a temporary autocorrelation function estimator adapted to derive values of a first column of the autocorrelation matrix from said input signal data, an autocorrelation function estimator adapted to derive average values of the autocorrelation values from outputs of said temporary autocorrelation function estimator in a circulative manner, so as to derive the autocorrelation matrix, a discrete Fourier transform unit for executing a discrete Fourier transform of a first row of the derived autocorrelation matrix, and deriving eigenvalues of the autocorrelation matrix, an inverse function generator for deriving reciprocals of the eigenvalues and an inverse discrete Fourier transform unit for executing an inverse discrete Fourier transform of the reciprocals of the eigenvalues, thereby deriving an inverse autocorrelation matrix;

an adder for adding an output of said filter to a desired response signal; and a weight vector corrector for correcting the weight vector of the filter using outputs of said matrix inverter and said adder.

2. An adaptive signal processor adapted to derive an inverse matrix of an autocorrelation matrix from input signal data so as to update a weight vector of the input signal data, comprising:

a filter for filtering said input signal data:

a matrix inverter for deriving the inverse autocorrelation matrix from said input signal data, said matrix inverter including a temporary autocorrelation function estimator adapted to derive values of a first column of the autocorrelation matrix from said input signal data, an autocorrelation function estimator adapted to derive average values of the autocorrelations values from outputs of said temporary autocorrelation function estimator in a circulative manner, so as to derive the autocorrelation matrix, a first discrete cosine transform unit for executing a discrete cosine transformation of selected elements of the derived autocorrelation matrix, thereby deriving eigenvalues of the autocorrelation matrix, an inverse function generator for deriving reciprocals of the eigenvalues, and a second discrete cosine transform unit for executing a discrete cosine transform of the reciprocals of the eigenvalues, thereby deriving the inverse autocorrelation matrix an adder for adding an output of said filter to a desired response signal; and a weight vector corrector for correcting the weight vector of the filter using outputs of said matrix inverter and said adder.

* * * * *

UNITED STATES PATENT AND TRADEMARK OFFICE
CERTIFICATE OF CORRECTION

PATENT NO. : 5,682,341
DATED : OCTOBER 28, 1997
INVENTOR(S) : KIM ET AL.

It is certified that error appears in the above-identified patent and that said Letters Patent is hereby corrected as shown below:

Col. 3, line 42, equation (10): "$\frac{1}{M}$" should read --$\frac{I}{M}$--

Col. 5, line 25: "$r_0$ to $r_{m-1}$" should read -- $\hat{r}$ to $\hat{r}_{m-1}$ --

Col. 5, line 42: "$r_i = \alpha^+{}_i + (1-\alpha)\hat{r}_1$" should read --$r_i = ar^+{}_i + (1-\alpha)\hat{r}_i$--

Col. 5, line 50: "$\lambda_{M-}$" should read --$\lambda_{M-1}$--

Col. 5, line 58: insert --the-- after the words "simplified in"

Signed and Sealed this

Twenty-seventh Day of October, 1998

Attest:

BRUCE LEHMAN

*Attesting Officer*      *Commissioner of Patents and Trademarks*